United States Patent
Childs et al.

(10) Patent No.: US 10,988,315 B1
(45) Date of Patent: Apr. 27, 2021

(54) ITEM STABILIZER

(71) Applicant: Amazon Technologies, Inc., Seattle, WA (US)

(72) Inventors: Jay D. Childs, Kent, WA (US); Feng Liu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/813,243

(22) Filed: Mar. 9, 2020

(51) Int. Cl.
| B65G 17/00 | (2006.01) |
| B65G 1/02 | (2006.01) |
| B65G 59/02 | (2006.01) |
| B65G 21/20 | (2006.01) |
| B65G 35/06 | (2006.01) |
| B65D 1/34 | (2006.01) |

(52) U.S. Cl.
CPC ............ B65G 17/002 (2013.01); B65D 1/34 (2013.01); B65G 1/026 (2013.01); B65G 21/2054 (2013.01); B65G 35/06 (2013.01); B65G 59/02 (2013.01); *B65G 2201/0258* (2013.01)

(58) Field of Classification Search
CPC ........ B65G 1/026; B65G 1/14; B65G 17/002; B65G 21/2054; B65G 35/06; B65G 59/02; B65G 2201/0258; B65G 2201/0261; B65G 2201/0267; B65G 2207/02; B65D 1/34; B65D 1/36
See application file for complete search history.

(56) References Cited

U.S. PATENT DOCUMENTS

| 5,301,790 A | * | 4/1994 | Prydtz ................. B65G 47/962 198/349 |
| 6,065,587 A | * | 5/2000 | Schindel ............ B65G 47/1457 198/392 |
| 7,153,089 B2 | * | 12/2006 | Wisniewski ......... B65G 57/302 414/797.7 |
| 7,318,519 B2 | * | 1/2008 | Sorensen ................. B65D 1/34 198/349 |
| 9,950,828 B2 | * | 4/2018 | Fujio ........................ B65D 1/34 |
| 10,543,942 B2 | * | 1/2020 | Almogy ............... B65G 17/002 |
| 2012/0228174 A1 | * | 9/2012 | Wegener ................ B65D 19/44 206/427 |
| 2014/0346068 A1 | * | 11/2014 | Omura .................... A61B 50/00 206/363 |
| 2019/0100349 A1 | * | 4/2019 | Mader .................... B65D 71/70 |

* cited by examiner

*Primary Examiner* — Gene O Crawford
*Assistant Examiner* — Keith R Campbell
(74) *Attorney, Agent, or Firm* — Kilpatrick Townsend & Stockton LLP

(57) ABSTRACT

A stabilizer can include an attachment surface and a non-stick surface. Multiple stabilizers can be arranged in a stack, e.g., such that the attachment surface of one stabilizer is engaged with the non-stick surface of another stabilizer. A stabilizer can be removed from the stack and attached to an item having a curved surface along the length of the item. The item, with the stabilizer attached, can be positioned on a conveyance surface, e.g., such that the stabilizer is between the conveyance surface and the item.

20 Claims, 4 Drawing Sheets

ITEM STABILIZER

BACKGROUND

Inventory systems, such as those in warehouses, supply chain distribution centers, airport luggage systems, and custom-order manufacturing facilities, face significant challenges in storing and transporting inventory items. The inventory items can be moved around. As the amount of inventory stored at a single location continues to grow, inefficient utilization of system resources, including space and equipment can result in lower throughput, unacceptably long response times, an ever-increasing backlog of unfinished tasks, and, in general, poor system performance. The inventory items can have various sizes and shapes that may use stabilization devices while moving around the inventory system.

BRIEF DESCRIPTION OF THE DRAWINGS

Various embodiments in accordance with the present disclosure will be described with reference to the drawings, in which.

DETAILED DESCRIPTION

Figure 1:
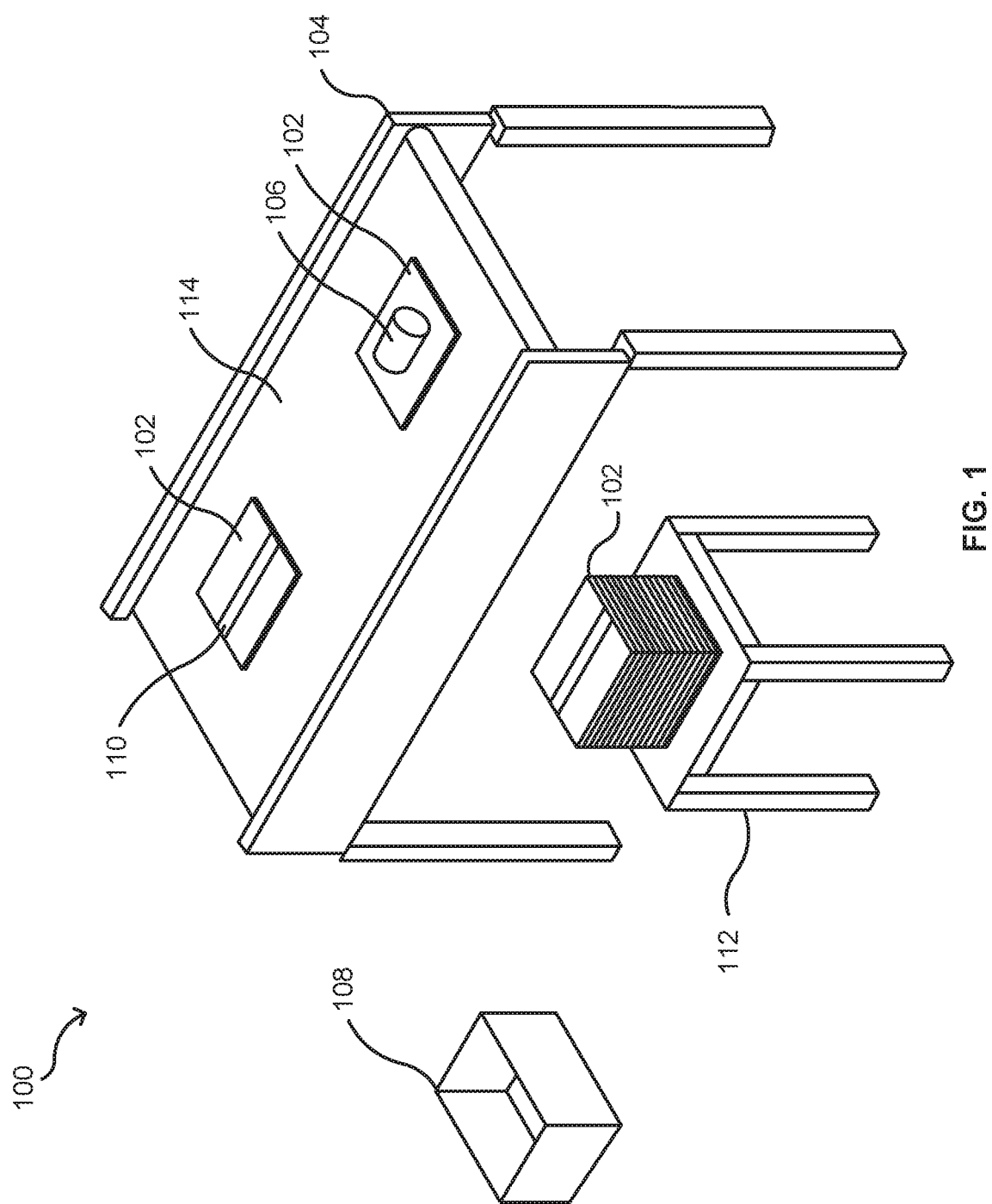
FIG. 1 illustrates an item conveyance system including a stabilizer positioned on a conveyance device, in accordance with embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples herein are directed to, among other things, systems and techniques relating to a stabilizer for stabilizing curved items during conveyance. The techniques described herein may be implemented by any suitable stabilizer, but particular examples are described that include a rigid or semi-rigid stabilizer having a two sides, a spine, and supports extending from each side of the spine. The stabilizer can include an attachment area on a first side positioned at, for example, the spine. The stabilizer can additionally or alternatively include a non-stick area on the second side positioned for engagement with an attachment area of another stabilizer.

The stabilizers can be used in any suitable warehouse environment, supply chain distribution centers, airport luggage systems, and custom-order manufacturing facilities, but particular stabilizer examples are described use with conveyance systems. For example, conveyance systems having belted and/or motor driven rollers. The stabilizers can be attached to items before the items are positioned on conveyance surfaces of the conveyance systems for conveyance of the items. For example, a stabilizer can be positioned between the conveyance surface and the item.

In embodiments, stabilizers can be stacked together and positioned, for example, next to a conveyance system. The stabilizers can include a flat sheet made of rigid or semi-rigid material. The flat sheet can include a first face, a second face, a spine, and support structures extending from opposite sides of the spine. The spine can include an attachment area of releasable adhesive on one side and, on a second side, a non-stick area for attaching to the attachment area of another stabilizer when the stabilizers are stacked together. One of the stabilizers can be removed from the stack and attached to a curved item, for example a cylinder, along the length of the item. The stabilizer with the item attached can be positioned on a conveyance surface of the conveyance system, such that the stabilizer is between the conveyance surface and the item. The support structures can contact the conveyance surface and the rigidity of the support structures can resist rolling of the item while the item is being conveyed by the conveyance system. After conveyance and while the item is still attached to the stabilizer, the item and stabilizer can be packed in a box and/or container for further processing. However, the item and the stabilizer may be separated before the item and/or the stabilizer are packed in the box and/or container.

Turning now to the figures, FIG. 1 illustrates an item conveyance system 100 including a stabilizer 102 positioned on a conveyance device 104, in accordance with embodiments. In embodiments described herein, one or more stabilizers 102 can be positioned next to a conveyance device, such as the conveyance device 104. The stabilizers 102 can be arranged, for example, such that the stabilizers are stacked one on top of another. A stabilizer 102 can be removed from the stack and attached to an item 106, for example, along the length of the item. With the item 106 attached, the stabilizer 102 can be positioned on the conveyance device 104. The stabilizer 102 can be positioned on the conveyance device 104, such that the stabilizer is positioned between the conveyance device and the item 106, and the conveyance device 104 can convey the stabilizer 102 with the item 106 attached. The strength and/or rigidity of the stabilizer 102 can resist the rolling of the item 106 when the item is being conveyed by the conveyance device 104. The item 106 and stabilizer 102 can be conveyed to a position for further processing. For example, the item 106 and stabilizer 102 can be conveyed to a position for packaging of the item 106 and/or the stabilizer 102 in a package 108. The stabilizer 102 with the item 106 attached can be positioned in the package 108. However, the item 106 and the stabilizer 102 may be separated prior to the item and/or the stabilizer being positioned in the package 108.

The stabilizer 102 can include a rigid or semi-rigid sheet having a first side (e.g., an attachment side), a second side (e.g., a non-stick surface), and a spine region 110. On the first side, the spine region 110 can include one or more attachment areas for attachment of one or more items 106 and/or for engaging with other stabilizers 102. On the second side, the spine region 110 can include one or more non-stick areas for engaging with another stabilizer 102. Support regions can extend from opposite sides of the spine region 110 and include material and/or structure to resist rolling of the item 106 when the item is attached to the stabilizer 102. The stabilizers 102 can be positioned in a warehouse environment adjacent to the conveyance device 104. As depicted in FIG. 1, the stabilizer 102 can be positioned on the conveyance device 104 in an orientation in which the first side (e.g., the attachment side) is arranged as an upper or top side and the second side (e.g., the non-stick surface) is depicted as a lower or bottom side, although other orientations for the stabilizer may be utilized elsewhere.

In various embodiments, one or more stabilizers 102 can be arranged in a stack. The stack of stabilizer 102 can be formed by engaging the attachment area of a first stabilizer with the non-stick area of a second stabilizer. An additional stabilizer 102 can be added to the stack in the same or a similar matter. In some embodiments, the stabilizers 102 can include additional features (e.g., alignment images) to aid in forming the stack of stabilizers. One or more stabilizers 102 can be removed from the stack by disengaging the stabilizers from the bottom and/or the top of the stack. For example, a stabilizer 102 can be removed from the top of the stack by disengaging the non-stick surface of the stabilizer from the attachment area of the stabilizer beneath it. Similarly, a stabilizer 102 can be removed from the bottom of the stack by disengaging the attachment area from the non-stick surface of the stabilizer above it.

The stack of stabilizers 102 can be positioned on a support structure 112 to aid in disengaging one or more of the stabilizers 102 from the stack. For example, the stack of stabilizers 102 can be positioned on an actuating table that raises in height as stabilizers are removed from the stack. The support structure 112 may additionally or alternatively include an attachment mechanism for holding the stack of stabilizers 102 in place. For example, the support structure 112 may include a clamp and/or adhesive to hold the stack of stabilizers 102 in place. The support structure 112 can be positioned at a height below or relatively aligned with the conveyance device 104 to aid a user in removing a stabilizer 102 from the stack. However, the support structure 112 may be positioned at a height above the conveyance device 104.

In some embodiments, the support structure 112 can be or include components for modifying the stabilizers 102. For example, the support structure 112 can receive one or more stabilizers 102 without an attachment area and include components for adding the attachment area to the stabilizers. The support structure 112 can additionally or alternatively include components for adding images, text, labels, computer readable symbols, or similar marks to one or more sides of the stabilizers 102. In further embodiments, the support structure 112 can include one or more components for manipulation of one or more stabilizers 102. For example, the support structure 112 can include a robotic arm for removal of a stabilizer 102 from the stack of stabilizers.

A stabilizer 102 can be removed from the stack of stabilizers and attached to one or more items 106 prior to positioning the items on the conveyance device 104. For example, a stabilizer 102 can be removed from the top of the stack of stabilizers, attached to an item 106, and placed on the conveyance device 104. However, stabilizers 102 may be positioned on the conveyance device 104 prior to attaching the item 106 to the stabilizer. The item 106 can additionally or alternatively be attached to a stabilizer 102 when the stabilizer is positioned on the stack of stabilizers and the stabilizer attached to the item can be removed from the stack and positioned on the conveyance device 104.

The item 106 can be or include a curved surface (e.g., a cylinder) that can be attached to the stabilizer 102. The stabilizer 102 can be aligned with and attached to the item 106 along a length of the item. For example, the stabilizer 102 can be aligned with a longitudinal axis going down the center of a cylindrical item 106. However, the item 106 may be attached to the stabilizer 102 in any suitable orientation. The stabilizer 102 and the item 106 can be attached along a planar section of a curved surface of the item 106 to resist rolling of the item along the curved surface. The item 106 can be or include a solid geometric figure with straight parallel sides and a circular or oval cross section, for example, a cylinder.

In various embodiments, the item 106 can be or include a round object with multiple curved surfaces, such as where every part of the surface or circumference is equidistant or approximately equidistant from the center (e.g., a sphere). The item 106 can be attached along a planar section of one or more of the curved surfaces and resist rolling of the item 106 along any of the other curved surfaces.

In some embodiments, the item 106 can include one or features to aid in attaching the item to the stabilizer 102. For example, the item 106 can include a mark and/or indicator to aid in attaching the item to the stabilizer 102. The item 106 can additionally or alternatively include adhesives, magnets, hook and loop components, or any suitable components to aid in attaching the item to the stabilizer 102.

The conveyance device 104 can convey and/or transport the item 106 and stabilizer 102 to various positions in a warehouse environment. For example, the item 106 and stabilizer 102 can be positioned on the conveyance device 104 at a loading location and the conveyance device can convey and/or transport the item and stabilizer to a packaging station at a packaging location. In some embodiments, the conveyance device 104 can include one or more sensors for detecting data associated with the items 106 and/or the stabilizers 102. For example, the conveyance device 104 can include an optical scanner for identifying a mark on a stabilizer 102. The mark may include data associated with the item 106, a customer, an item location, or similar data.

In various embodiments, The conveyance device 104 can be or include a conveyance surface 114. The conveyance surface 114 can be or include a conveyor (belted or non-belted) and/or rollers (motor driven, belted, or idle) for conveying and/or transporting the item 106 and the stabilizer 102. For example, the conveyance surface 114 can include belted, motor-driven rollers. The conveyance surface 114 can additionally or alternatively include features and/or components for engaging with the stabilizer 102 and/or the item 106. For example, the conveyance surface 114 can include engagement components for holding the stabilizer 102 in position on the conveyance surface.

The conveyance device 104 can convey the item 106 attached to the stabilizer 102 to a station for packaging of the item and/or stabilizer. For example, the item 106 can be detached from the stabilizer 102 and the item 106 can be positioned inside a package 108 directly against a packaging surface (e.g., the bottom of the package). However, the item 106 with the stabilizer 102 attached can be positioned in the package 108 with the stabilizer positioned between the packaging surface and the item.

In various embodiments, the item 106 and/or the stabilizer 102 may be positioned on a packaging surface that is not yet part of a package 108. For example, the item 106 and/or the stabilizer 102 may be positioned on a piece of flat material that is formed into a package 108 around the item and/or stabilizer. The item 106 and/or the stabilizer 102 may additionally or alternatively be positioned on a packaging surface that is itself positioned inside a package 108.

Figure 4:
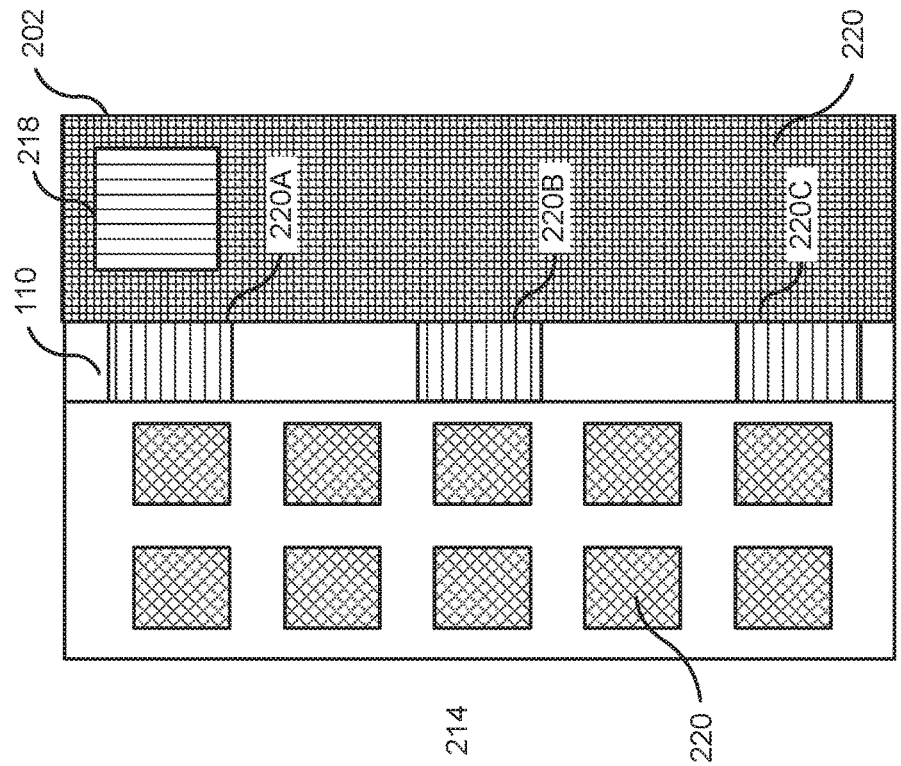
FIGS. 2 through 4 illustrate various views of an example stabilizer that can be included in particular embodiments of the item conveyance system of FIG. 1.
Figure 3:
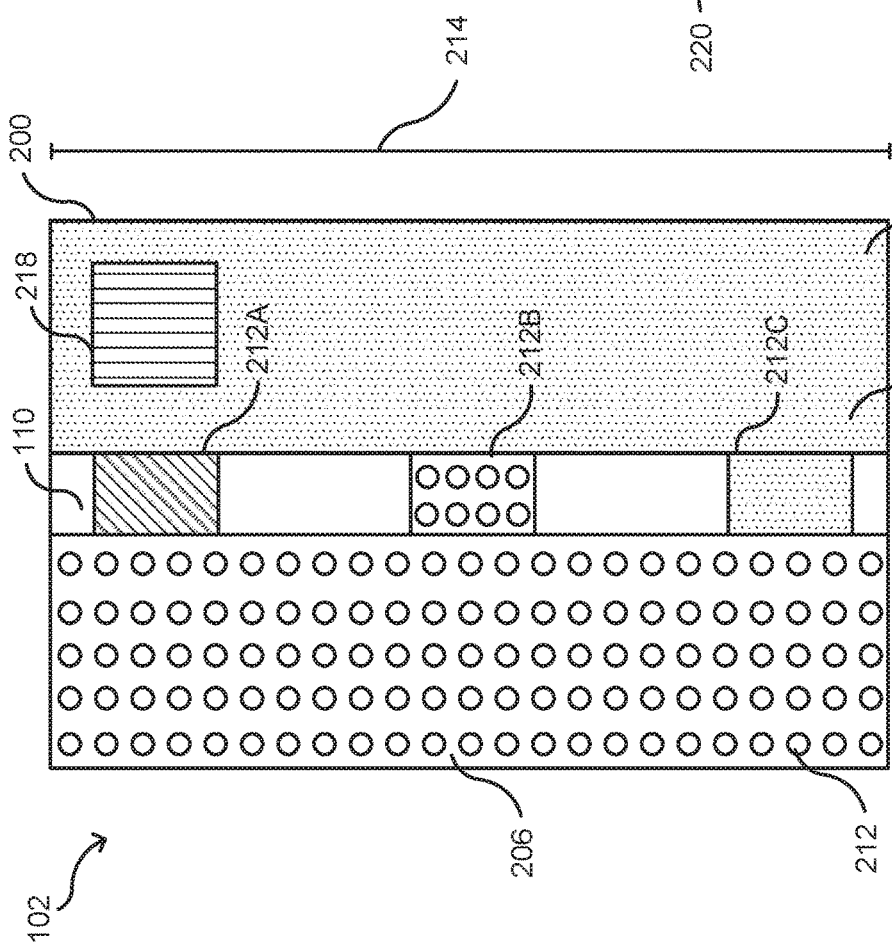
Figure 2:
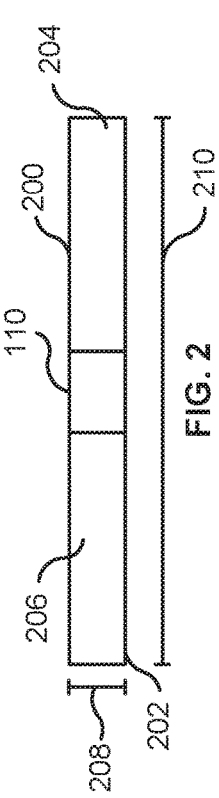

Turning to FIGS. 2 through 4, various views of an example stabilizer 102 that can be included in particular embodiments of the item conveyance system 100 of FIG. 1 are shown. FIG. 2 is a detailed side view of the example stabilizer 102 that can be included in particular embodiments of the item conveyance system 100 of FIG. 1. The stabilizer 102 can be or include a sheet to which items 106 can be attached. The stabilizer 102 can be rigid or semi-rigid, for example, having flexibility, a resistance to bending, and a resilience to return to the original shape after bending. The nature of the stabilizer 102 may bias the stabilizer toward moving toward a flat or other original state after being bent or otherwise moved. The stabilizer 102 can resist deflection, deformation, and/or bending caused by the rolling of the items 106 attached to the stabilizer. For example, the stabilizer 102 can resist the rolling of an item 106 weighing up to 25 pounds. However, the stabilizer 102 may resist rolling of an item 106 weighing greater than 25 pounds. The resistance to rolling may prevent or otherwise mitigate rolling of the items 106 relative to the stabilizer 102, relative to the conveyance surface 114 and/or relative to other structures. The resistance to rolling may be provided at least in part by a stiffness of the stabilizer 102. The stiffness of the stabilizer can be in the range of 100 pounds per inch (PSI) to 700 PSI. However, the stiffness of the stabilizer can be below 100 PSI and above 700 PSI.

The stabilizer 102 can include one or more types of material. The material of the stabilizer 102 can include material that is thicker and heavier than, for example, freesheet paper. The stabilizer 102 may also be or include corrugated, cardboard, plastic, metal, ABS, PVC, carbon fiber, or any suitably rigid or semi-rigid material. In various embodiments, the stabilizer 102 can be or include flute B and/or flute D corrugated.

The stabilizer 102 can include a height 208, a width 210, and a length 214. As an illustrative example, the stabilizer 102 can have a height 208 of 0.5 mm, a width of 100 mm, and a length of 150 mm. The height 208 of the stabilizer 102 can be or include one or more layers. The layers may have the same or similar thicknesses or may have varying thicknesses. In various embodiments, the stabilizer 102 has a single layer with two opposing faces. The opposing faces can be or include the attachment surface 200 and the non-stick surface 202 respectively. The layers can include features and/or marks designating various layers. For example, a middle layer may include different features than an exterior layer.

The stabilizer 102 can be a single sheet of material that includes one or more regions. For example, the width 210 of the stabilizer 102 can include a first support region 204, a second support region 206, and a spine region 110. As an illustrative example, the stabilizer 102 may have a width 210 of 100 mm with the spine region 110 having a width of 10 mm and the support regions 204, 206 each having a width of 45 mm. The regions can be designated (e.g., by scoring, marks, cuts, or similar features) or may be designated by their position (e.g., a region at the center of the stabilizer 102 is the spine region 110 and the regions on either side or the support regions 204, 206).

In some embodiments, the width 210 of the stabilizer 102 can include one or more pieces that can correspond to the regions (e.g., the spine region 110 and first and second support regions 204 and 206, respectively). For example, the pieces may include a first piece (e.g., the first support region 204), a second piece (e.g., the spine region 110), and a third piece (e.g., the second support region 206). The pieces can be arranged such that the first and third pieces extend from opposing sides of the piece (e.g., from left and right sides). The sections may be joined together using adhesives and/or any suitable joining material.

In various embodiments, the first support region 204, the second support region 206, and/or the spine region 110 can be or include stabilizing elements to resist rolling of the items 106. For example, the support regions 204, 206 can be connected to the spine region 110 via a moveable joint that flexes in response to the item 106 rolling. The moveable joint can reduce and or eliminate the force generated by the item 106 as it tries to roll.

The layers and/or the sections can include one or more materials. The materials can be rigid or semi-rigid to aid in resisting rolling of the item 106. The material can additionally or alternatively be or include material to aid in the conveyance of the item 106. For example, the material can be or include soft material to cushion the item 106. The material of the stabilizer 102 can vary along the height 208 and/or width 210 of the stabilizer 102 (e.g., the stabilizer can have different heights 208 along the width of the stabilizer 102 and/or the stabilizer can have different widths along the height of the stabilizer). In further embodiments, a layer can have different material at various points along the width 210 or the same material at various points along the width. Additionally or alternatively, a section can have different material at various points along the height 208 or may have the same material at various points along the height.

In various embodiments, the stabilizer 102 can include one or more strengthening features. The strengthening features can increase the rigidity of the stabilizer 102 and/or aid in resisting the rolling of item 106 when the item is attached to the stabilizer. Layers and/or sections can be or include strengthening members, including but not limited to, multiple materials, strengthening members, and/or any features suitable for strengthening the stabilizer 102. These strengthening features can extend a portion or the whole width 210 and/or height 208 of the stabilizer. For example, a strengthening features can extend along the width 210 direction from one edge of the first support region 204 to an opposing edge and/or from one edge of the second support region 206 to the opposing edge. Additionally or alternatively, a strengthening feature can extend from one face of the stabilizer 102 (e.g., the attachment surface 200) to an opposing face (e.g., the non-stick surface 202).

FIG. 3 is a detailed top view of the example stabilizer 102 including an attachment surface 200 that can be included in particular embodiments of the item conveyance system 100 of FIG. 1. The attachment surface 200 can include one or more attachment areas 212 to attach the stabilizer 102 to the item 106. For example, attachment areas 212A and 212B can be attached along the length of an item 106. The attachment areas 212 can be positioned on the stabilizer 102 along the width 210, the length 214, diagonally, and/or in any suitable pattern. The attachment areas 212 can be designated via a mark and/or feature. For example, the attachment areas 212 can be or include an outline around an area where an item 106 should be attached. The attachment areas 212 can be or include a target or similar mark to aid in attaching the item 106 to the attachment area. For example, a target can be positioned at or near the middle of an attachment area 212 to aid in aligning an item 106 with the attachment area.

In various embodiments, the attachment areas 212 can be positioned along the length 214 of the spine region 110. For example, three attachment areas 212A, 212B, and 212C can be positioned along the length 214 of the spine. However, a single attachment area 212 may extend along all or most of the length 214 of the spine region 110. The attachment areas 212 can have a geometric shaped (e.g., a rectangle, a circle, or a triangle). The attachment areas 212 can additionally or alternatively be spaced apart in a geometric and/or repeating patterns. As an illustrative example, the attachment areas 212 can be circles with an 8 mm diameter and the circles can be spaced 14 mm apart (e.g., from center-to-center) from one another along the spine region 110 of the stabilizer 102.

The attachment areas 212 can additionally or alternatively be positioned at any suitable position on the attachment surface 200. For example, the attachment areas 212 can be positioned on the support regions 204, 206. In various embodiments, multiple attachment areas 212 may be attached to a single item 106 (e.g., attachment areas 212A, 212B and/or 212C may be used to attach item 106), each attachment area 212 may be used to attach to a single item, (e.g., each of the attachment areas 212A, 212B, and 212C are attached to first, second, and third items, respectively), or a single attachment area 212 may be used to attach multiple items, (e.g., attachment area 212A may be attached to first and second items 106).

In some embodiments, one or more attachment areas 212 can be positioned on the first and/or second support regions 204, 206. The attachment areas 212 can cover all, some, or most of the support regions 204, 206. The attachment areas 212 positioned on the first and/or second support regions 204, 206 can allow or aid in attaching the items 106 to the stabilizer 102. For example, a portion of an item 106 can be attached to attachment area 212A and oriented, such that, a portion of the item extends to the first and/or second support regions 204, 206. The portion of the item 106 that extends to the first and/or second support regions 204, 206 can be attached to the support structures via the attachment material and/or features.

The attachment areas 212 can be or include attachment material and/or features for attaching the stabilizer 102 with at least a portion of items 106 and/or for attaching the stabilizer with another stabilizer. The attachment areas 212 can include the same or similar attachment material and/or features or the attachment areas 212 can include different attachment materials and/or features. For example, the first attachment area 212A can include a first attachment material and/or feature, the second attachment area 212B can include a second attachment material and/or feature, and/or the third attachment area 212C can include a third attachment material and/or feature. The attachment material can be or include a releasable adhesive or otherwise have bonding properties that adheres (e.g., chemically attaches two or more surfaces together) the stabilizer 102 with another stabilizer and/or with an item 106 throughout the service life of the stabilizer while allowing removal of the item and/or other stabilizer without causing damage. The service life of the stabilizer 102 may be single use (e.g., attachment to another stabilizer and/or an item 106 once) or may be multiple uses (attaching to stabilizers and/or items multiple times). The attachment material and/or feature 216 can be or include releasable adhesive, cyanoacrylate adhesive, hot melt adhesive, pressure sensitive adhesive, polyurethane, fugitive adhesive, latex adhesive, low-tack adhesive, hook and loop connectors, magnets pressure-sensitive hot melt adhesive, bond pressure sensitive adhesive, removable adhesive, glue, epoxy, rubber, suction, and/or any suitable material and/or features for attaching the item 106 to the stabilizer 102. In some embodiments, the attachment areas 212 can be or include raised features to aid in attaching the item 106 with the stabilizer.

In some embodiments, the stabilizer 102 and/or the attachment areas 212 can be or include transparent or semi-transparent material. The transparent or semi-transparent material can allow a portion (e.g., a label) of the item 106 to be scanned through the stabilizer 102. For example, an item 106 can be oriented and attached to the attachment area 212 with a label facing towards the stabilizer 102. A sensor and/or scanner can be positioned to scan the label through the transparent or semi-transparent material of stabilizer 102 and detect data associated with the label. The sensor and/or scanner may additionally or alternatively scan a portion of the item 106 containing a barcode, product name, logo, or a similar marking. The transparent or semi-transparent material can include polycarbonate, acrylic, and/or any suitable material that can allow a portion of an item to be scanned through the material.

In further embodiments, the stabilizer 102 can include a cutout and/or window area. An item 106 can be attached to the stabilizer 102 and positioned, such that, a portion of the item is readable through the cutout. For example, the cutout can be positioned in the spine region 110 and allow a label of an item 106 to be positioned over the cutout to allow a scanner and/or sensor to detect the label.

Turning to FIG. 4, a detailed bottom view of the example stabilizer 102 including a non-stick surface 202 that can be included in particular embodiments of the item conveyance system 100 of FIG. 1 is shown. The non-stick surface 202 can include one or more non-stick areas 220. The non-stick areas 220 can be or include a substance that reduces the ability of other materials to stick to it. For example, the non-stick areas 220 can include be or include material that allows non-stick areas of a stabilizer 102 to attach and detach from the attachment areas 212 of another stabilizer. The non-stick areas 220 can be or include surfaces and/or coatings including polytetrafluoroethylene (PTFE), anodized aluminum, ceramics, silicone, enameled cast iron, or any suitable non-stick material.

The non-stick areas 220 can be attached to and/or detached from attachment areas 212 one or more times. In various embodiments the attachment areas 212 can be attached and removed from the non-stick areas 220 leaving little or no residue. Additionally or alternatively, the non-stick areas 220 can include material that keeps the attachment area 212 attached until a certain threshold force has been met. For example, the non-stick areas 220 can attach to the attachment areas 212 to form a stack of stabilizers 102. The non-stick areas 220 can engage with the attachment areas 212 and prevent a stabilizer 102 from being removed from the stack until a threshold force has been reached, at which point the stabilizer can be removed.

In further embodiments, the non-stick areas 220 can detach from the attachment areas 212 at a lower force threshold than the force threshold needed to detach the item 106 from the attachment areas. The lower detachment threshold of the non-stick areas 220 and the attachment areas 212 can allow for the use of an item 106 to detach a stabilizer 102 from a stack of stabilizers. As an illustrative example, first and second stabilizers 102 can be positioned in a stack (e.g., the non-stick areas 220 of the first stabilizer are attached to the attachment areas 212 of the second stabilizer), an item 106 can be attached to the attachment areas 220 of the first stabilizer, and a force can be applied to the item that detaches the first and second stabilizers while leaving the item and first stabilizer attached.

The non-stick areas 220 can be positioned on the non-stick surface 202 at positions to align with the attachment areas 212. For example, when there are three attachment areas 212A, 212B, 212C positioned along the length 214 of the spine region 110, there can be three non-stick areas positioned along the length of the spine to engage with the three attachment areas. In various embodiments, the amount of attachment areas 212 and the amount of non-stick areas 220 may vary. For example, there may be three attachment areas 212A, 212B, 212C positioned along the spine region 110 and a single non-stick area 220 that extends all or most of the length 214 of the spine.

In various embodiments, non-stick areas 220 can be positioned on the support regions 204, 206. The non-stick areas 220 positioned on the support regions 204, 206 can be positioned in a pattern that mirrors the pattern of the attachment points positioned on the support regions 204, 206 of another stabilizer 102. The non-stick areas 220 positioned on the first and/or second support regions 204, 206 can include the same or similar material and/or features as the non-stick areas 220 positioned along the spine region 110.

In further embodiments, the attachment surface 200 and/or the non-stick surface can include one or more marks 218. The marks 218 can be positioned at various points on the attachment surface 200 and/or the non-stick surface 202. The marks 218 on the attachment surface 200 and the non-stick surface can be the same, similar, or may differ from one another. The marks 218 can be or include an image, text, and/or marks. In various embodiments, the marks 218 can be or include a target and/or marks to aid in alignment of an item 106 and/or alignment of another stabilizer 102. For example, the marks 218 can be positioned along the spine region 110 at a position for aligning an item 106 to attach the item to the stabilizer 102. The marks 218 can additionally or alternatively include one or more features that can be detected by a sensor. For example, the marks 218 can include marks that can be detected by an optical scanner. In further embodiments, the marks 218 can correspond to data associated with the item 106 and/or the stabilizer 102. For example, the marks 218 can correspond to order data associated with the item 106. The marks 218 can additionally or alternatively be or include images and/or text. The images and/or text can include information associated with the item 106, the stabilizer 102, marketing images, and/or any images or text that can suitably be printed on the stabilizer. For example, the mark 218 can be or include a logo.

In some embodiments of the stabilizer 102, the attachment areas 212 and/or the non-stick areas 220 can be moved. For example, the attachment areas 212 can be moved from a first position on the attachment surface 200 to a second position on the attachment surface. Further, the attachment areas 212 can be moved from a first position on the attachment surface 200 to a second position on the non-stick surface 202.

In various embodiments, the non-stick areas 220 and the attachment areas 212 can be positioned on the stabilizer 102 at different times. For example, the non-stick areas 220 can be positioned on the non-stick surface 202 prior to the attachment areas 212 being positioned on the attachment surface 200. In some embodiments, the attachment areas 212 and/or non-stick areas 220 can be positioned on the stabilizer 102 when the item is positioned on or adjacent to a conveyance device 104. For example, attachment areas 212 may be positioned on the attachment surface 200 when the stabilizer 102 is positioned on the support structure 112. The attachment areas 212 and/or the non-stick areas 220 can be positioned on the stabilizer 102 via a manual or automated process, for example, using a robotic manipulator.

Figure 5:
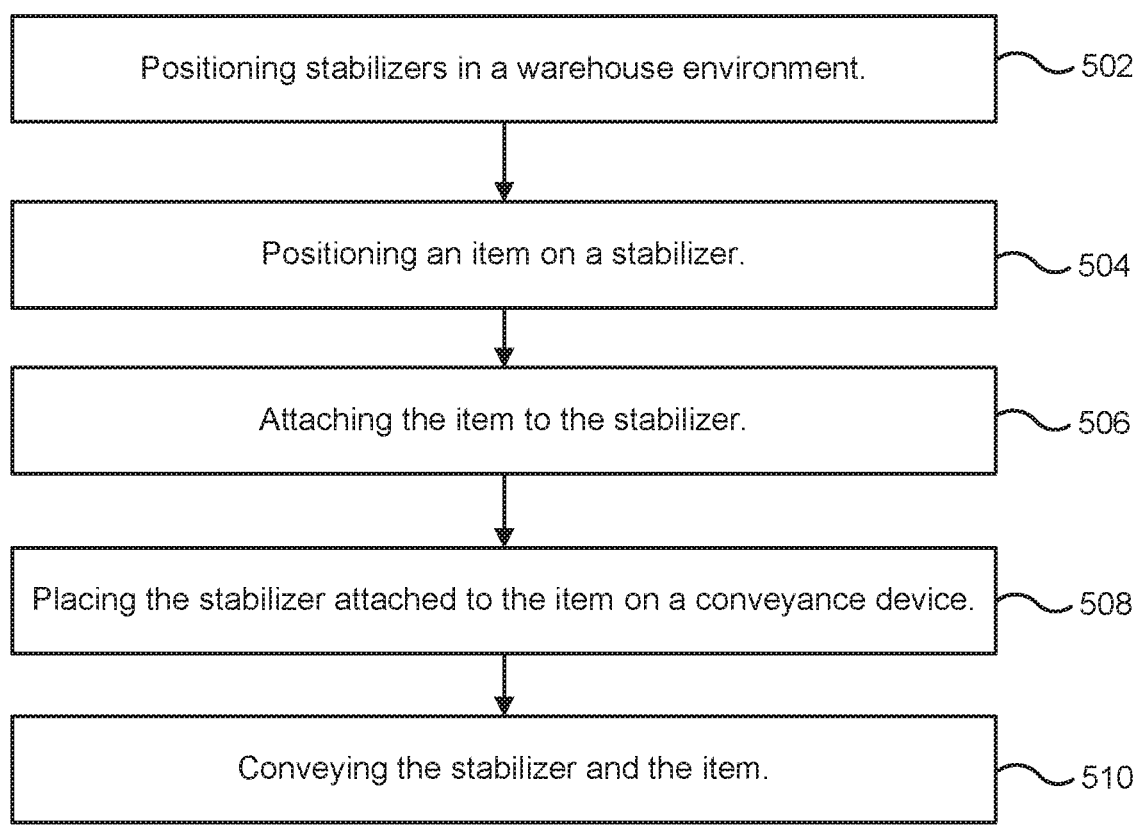
FIG. 5 is a flowchart illustrating a process for attaching an item to an example stabilizer for use with the item conveyance system of FIG. 1.

Turning to FIG. 5, a flowchart illustrating a process 500 for attaching an item 106 to an example stabilizer 102 for use with the item conveyance system 100 of FIG. 1 is shown. Various blocks are described by referencing the components shown in FIG. 6, however, additional or alternative components may be used with the process.

The process 500 at block 502 can include positioning one or more stabilizers (e.g., stabilizers 102) in a warehouse environment, for example, at a position for attaching one or more items (e.g., items 106) to stabilizer 102. The stabilizers 102 can be positioned in a stack. The stack of stabilizers 102 can be formed by engaging an attachment area 212 of a first stabilizer with a non-stick area 220 of a second stabilizer. The stabilizers 102 can additionally or alternatively be positioned adjacent to a conveyance device (e.g., conveyance device 104).

In various embodiments the stabilizers 102 (e.g., in a stack or individually) can be positioned in a layering mechanism. The layering mechanism can add one or more layers to the stabilizers 102. For example, the stabilizers 102 can add attachment areas 212 and/or non-stick areas to the stabilizers.

In further embodiments, the stabilizers 102 can additionally or alternatively be positioned on a support structure 112. The support structure 112 may be located in the warehouse environment when receiving the stabilizers 102 or may be located out of the warehouse environment when receiving the stabilizers. In various embodiments, the stabilizers 102 may be moved around the warehouse environment to various positions. For example, the stabilizers 102 may be positioned at a first conveyance device 104 for removal of a first stabilizer and repositioned to a second conveyance device for removal of a second stabilizer. The stabilizers 102 may be moved around the warehouse environment using a robotic manipulator, a mobile drive unit, a unmanned aerial vehicle, and/or any suitable device for moving the stabilizers.

The process 500 at block 504 can include positing an item 106 on a stabilizer 102. The stabilizer 102 can be positioned along a length of the item 106. The item 106 can be aligned with the attachment surface 200 and/or a portion of the stabilizer 102 suitable for attaching the item to the stabilizer. For example, the item 106 can be aligned with attachment areas 212 positioned on the spine region 110 of the stabilizer 102. However, the item 106 may be aligned with any suitable portion of the stabilizer 102 (e.g., support regions 204, 206). The item 106 and the stabilizer 102 can be aligned when the stabilizer 102 is arranged on a stack of stabilizers. For example, the item 106 can be aligned with a stabilizer 102 positioned on a top of stabilizers. In some embodiments, the item 106 and the stabilizer 102 can be aligned when the stabilizer 102 has be removed from a stack of stabilizers. For example, the stabilizer 102 can be removed from the stack of stabilizers and the item 106 can be aligned with the stabilizer that has been removed.

In various embodiments, the positioning of the item 106 on the stabilizer 102 can be aided by mark 218. For example, mark 218 can be or include a target for aligning the item 106.

The process 500 at block 506 can include attaching the item 106 to the stabilizer 102. However, the item 106 can be aligned and/or attached with multiple stabilizers 102. Attaching the item 106 to the stabilizer 102 can include engaging a portion of the item with a portion of the stabilizer. For example, the item 106 can be attached to the stabilizer 102 by engaging a portion of the item with one or more attachment areas 212. A threshold force can be used to attach the item 106 to the stabilizer 102. The threshold force can be applied to the item 106 and/or the stabilizer 102.

In some embodiments, the attachment between the item 106 and the stabilizer 102 can be stronger than the attachment between the stabilizer and another stabilizer. For example, when the stabilizers 102 are arranged in a stack, the item 106 can be attached to the stabilizer on the top or bottom of the stack. The item 106 can then be used to disengage the stabilizer 102 from the top and/or bottom of the stack (e.g., the item can be pulled and the stabilizer can disengage from the stack).

In further embodiments, attaching the item 106 and the stabilizer 102 can include treatment of the stabilizer. For example, adhesives can be applied to one or more attachment areas and the item 106 can be attached to the engagement areas.

Figure 6:
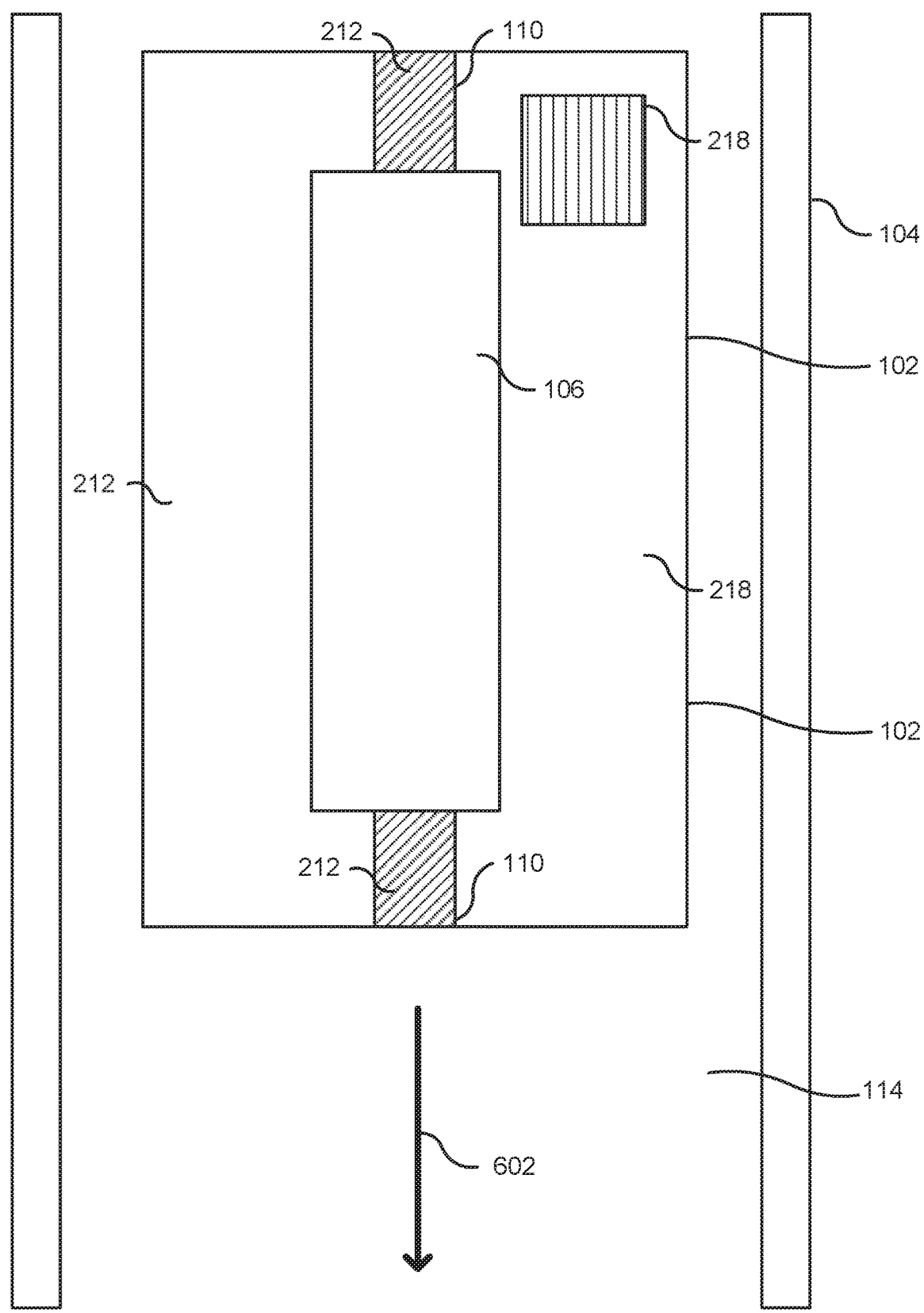
FIG. 6 illustrates a simplified example process for conveying items that can be used with particular embodiments of the conveyance system of FIG. 1.

The process 500 at block 508 can include placing the stabilizer 102 attached to the item 106 on a conveyance device (e.g., conveyance device 104). As shown in FIG. 6, the stabilizer 102 can be positioned on the conveyance device 104, such that, the stabilizer is between the conveyance device 104 and the item 106. The stabilizer 102 can be positioned on the conveyance surface 114. The non-stick surface 202 and/or the conveyance surface 114 can include one or more features for receiving the stabilizer. For example, the conveyance surface 114 can include one or more marks for aligning the stabilizer 102.

In various embodiments, the item 106 and stabilizer 102 can be aligned with the conveyance device 104 in a conveyance direction 602. For example, the item 106 and stabilizer 102 can be aligned with the conveyance direction 602, such that, the length 214 is parallel to the direction of travel. However, the item 106 and stabilizer 102 can be positioned on the conveyance device 104 at any suitable orientation.

The process 500 at block 510 can include conveying the item 106 and stabilizer 102. The item 106 and stabilizer 102 can be conveyed in conveyance direction 602. The item 106 and stabilizer 102 can be conveyed to a location for further processing of the item and/or the stabilizer. In some embodiments, the item 106 an/or the stabilizer 102 can be positioned in a package after conveyance. Conveyance of the item 106 and the stabilizer 102 can include operating the conveyance device 104. However, additional and/or alternative conveyance devices can be used for conveying the item and stabilizer.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
a plurality of stabilizers arranged in a stack of stabilizers, wherein each stabilizer of the plurality of stabilizers comprises:
a flat sheet comprising a first face, a second face, a spine region, and first and second support regions extending from opposite sides of the spine region, the flat sheet comprising a material that is rigid or semi-rigid so as to provide a resistance to bending;
a releasable adhesive positioned on the first face at the spine region; and
a non-stick area positioned on the second face along the spine region and comprising a non-stick surface configured to releasably engage with a second releasable adhesive of a second stabilizer of the plurality of stabilizers so that the plurality of stabilizers are arrangeable in the stack of stabilizers, with the releasable adhesive engaged with the non-stick surface of an adjacent stabilizer; and
an item having a curved surface such that when the item, with the stabilizer attached, is placed on a surface with the stabilizer between the item and the surface, the resistance to bending of the flat sheet causes the first and second support regions to extend along the surface and resist rolling of the item.

2. The system of claim 1, wherein at least one of the plurality of stabilizers comprises at least one of corrugated flutes, cardstock, cardboard, plastic, polycarbonate, acrylic, ABS, or carbon fiber.

3. The system of claim 1, wherein the releasable adhesive comprises at least one of releasable adhesive, cyanoacrylate adhesive, hot melt adhesive, pressure sensitive adhesive, polyurethane, fugitive adhesive, latex adhesive, low-tack adhesive, hook and loop connectors, or magnets.

4. The system of claim 1, wherein the releasable adhesive is positioned at a plurality of locations along the spine region.

5. A stabilizer comprising:
 a rigid or semi-rigid base comprising a first face, a second face, a spine region, and first and second support regions extending from opposite sides of the spine region;
 an attachment area positioned on the first face and attachable along a length of an item having a curved surface such that when the item, with the stabilizer attached, is placed on a surface with the stabilizer between the item and the surface, the base causes the first and second support regions to extend along the surface and resist rolling of the item; and
 a non-stick area positioned on the second face and comprising a non-stick surface configured to releasably engage with an attachment area of another stabilizer so that the stabilizers are arrangeable in a stack.

6. The stabilizer of claim 5, wherein at least one of the attachment area or the non-stick area is positioned on the first face at the spine region.

7. The stabilizer of claim 5, wherein the first face or the second face comprises a mark comprising at least one of an image or text.

8. The stabilizer of claim 5, wherein the attachment area comprises releasable adhesive configured to engage with and disengage from the item.

9. The stabilizer of claim 5, wherein the attachment area is configured to disengage with the item in response to a first force and the non-stick area is further configured to disengage with the attachment area of the another stabilizer in response to a second force, and wherein the second force is smaller than the first force.

10. The stabilizer of claim 5, wherein the base has a stiffness between 100 pounds per inch and 700 pounds per inch.

11. The stabilizer of claim 5, wherein the attachment area is a first attachment area and the stabilizer further comprises a second attachment area positioned on the first face.

12. The stabilizer of claim 11, wherein the first attachment area is positioned on the spine region and the second attachment area is positioned on the first or second support regions.

13. The stabilizer of claim 5, wherein the item is a first item, the attachment area is configured to detach from the first item and attach along a second length of a second item having a second curved surface.

14. A method comprising:
 positioning an item having a curved surface on a rigid or semi-rigid stabilizer having a first face, a second face, a spine region, and first and second support regions extending from opposite sides of the spine region;
 attaching the first face of the stabilizer to the item along a length of the item; and
 positioning, with the item attached to the stabilizer, the item on a conveyance surface with the stabilizer between the item and the conveyance surface, wherein the first and second support regions extend along the conveyance surface and resist rolling of the item.

15. The method of claim 14, wherein, prior to positioning the item on the stabilizer, the method comprises removing the stabilizer from a stack of stabilizers by disengaging a non-stick surface positioned on the second face with an attachment area of another stabilizer.

16. The method of claim 14, wherein positioning the item on the stabilizer comprises positioning the item on a stabilizer attached to a stack of stabilizers, wherein a non-stick surface positioned on the second face is engaged with an attachment area of another stabilizer of the stack of stabilizers.

17. The method of claim 16, wherein, prior to positioning the item on the conveyance surface, the method further comprises, with the item attached to the stabilizer, removing the stabilizer from the stack of stabilizers.

18. The method of claim 14, wherein attaching the item to the first face of the stabilizer comprises attaching the item to an attachment area positioned on the first face of the stabilizer at the spine region.

19. The method of claim 14, wherein positioning the item on the stabilizer comprises aligning the item with a mark on the first face of the stabilizer.

20. The method of claim 14 further comprising:
 conveying, with the item attached to the stabilizer, the item on the conveyance surface; and
 positioning, with the item attached to the stabilizer, the item in a package or on a packaging surface.

* * * * *